United States Patent
Knoll et al.

(10) Patent No.: US 7,470,746 B2
(45) Date of Patent: Dec. 30, 2008

(54) TRANSPARENT MIXTURES OF LINEAR STYRENE-BUTADIENE BLOCK COPOLYMERS

(75) Inventors: Konrad Knoll, Mannheim (DE); Daniel Wagner, Bad Dürkheim (DE); Jürgen Koch, Neuhofen (DE); Peter Merkel, Kapellen (BE)

(73) Assignee: BASF SE, Ludwigshafen (DE)

( * ) Notice: Subject to any disclaimer, the term of this patent is extended or adjusted under 35 U.S.C. 154(b) by 332 days.

(21) Appl. No.: 11/297,470

(22) Filed: Dec. 9, 2005

(65) Prior Publication Data

US 2006/0128890 A1 Jun. 15, 2006

(30) Foreign Application Priority Data

Dec. 10, 2004 (DE) .................. 10 2004 059 783

(51) Int. Cl.
*C08L 53/02* (2006.01)
(52) U.S. Cl. ........................................ 525/89; 525/271
(58) Field of Classification Search ................... 525/89, 525/271
See application file for complete search history.

(56) References Cited

U.S. PATENT DOCUMENTS

| | | | |
|---|---|---|---|
| 4,335,221 A | | 6/1982 | Gerberding |
| 4,379,891 A | * | 4/1983 | Haynes ....................... 525/342 |
| 5,227,419 A | | 7/1993 | Moczygemba et al. |
| 5,270,396 A | * | 12/1993 | Farrar et al. ................. 525/271 |
| 5,587,425 A | * | 12/1996 | Moczygemba et al. ........ 525/98 |
| 5,693,718 A | | 12/1997 | De Groot et al. |
| 5,705,569 A | * | 1/1998 | Moczygemba et al. ...... 525/314 |
| 6,025,071 A | | 2/2000 | Cameron et al. |
| 6,541,569 B1 | | 4/2003 | Morris et al. |
| 6,593,430 B1 | | 7/2003 | Knoll et al. |
| 2002/0016386 A1 | * | 2/2002 | Napadensky ................. 523/201 |
| 2002/0103297 A1 | | 8/2002 | Nomura et al. |
| 2005/0009990 A1 | * | 1/2005 | Knoll et al. .................... 525/89 |
| 2007/0093601 A1 | * | 4/2007 | Watanabe et al. ............. 525/89 |
| 2008/0076901 A1 | * | 3/2008 | Garrett et al. ................. 528/44 |

FOREIGN PATENT DOCUMENTS

| | | |
|---|---|---|
| EP | 0 492 490 A2 | 1/1992 |
| WO | WO-00/58380 | 10/2000 |
| WO | WO-00/58380 A1 | 10/2000 |
| WO | WO-03/046075 A1 | 6/2003 |

OTHER PUBLICATIONS

Kunststoffhandbuch, vol. 4 (Polystyrol), Carl Hanser-Verlag Muchen-Wien 1996; Kapitel 3.3.4, p. 161-164.

* cited by examiner

*Primary Examiner*—Jeffrey C Mullis
(74) *Attorney, Agent, or Firm*—Connolly Bove Lodge & Hutz LLP

(57) ABSTRACT

Mixtures comprising linear block copolymers composed of vinylaromatic monomers and dienes of the structure (I) $S_1$-$B_1$-$S_2$ and (II) $B_2$-$S_3$, where $S_1$ is a block composed of vinylaromatic monomers whose number-average molar mass $M_n$ is in the range from 40 000 to 100 000 g/mol, each of $S_2$ and $S_3$ is a block composed of vinylaromatic monomers whose number-average molar mass $M_n$ is in the range from 5000 to 20 000 g/mol, each of $B_1$ and $B_2$ is one or more blocks composed of dienes or is copolymer blocks composed of dienes and vinylaromatic monomers whose number-average molar mass $M_n$ is in the range from 15 000 to 100 000 g/mol, and the ratio of block copolymers (I)/(II) is in the range from 0.5 to 10, and their use for impact-modification of blends using polystyrene.

20 Claims, No Drawings

TRANSPARENT MIXTURES OF LINEAR STYRENE-BUTADIENE BLOCK COPOLYMERS

The invention relates to mixtures comprising linear block copolymers composed of vinylaromatic monomers and dienes of the structure (I) $S_1$-$B_1$-$S_2$ and (II) $B_2$-$S_3$, where $S_1$ is a block composed of vinylaromatic monomers whose number-average molar mass $M_n$ is in the range from 40 000 to 100 000 g/mol, each of $S_2$ and $S_3$ is a block composed of vinylaromatic monomers whose number-average molar mass $M_n$ is in the range from 5000 to 20 000 g/mol, each of $B_1$ and $B_2$ is a block composed of dienes or is a copolymer block composed of dienes and of vinylaromatic monomers whose number-average molar mass $M_n$ is in the range from 15 000 to 100 000 g/mol, and the ratio of the block copolymers (I)/(II) is in the range from 0.5 to 10. The invention further relates to processes for preparation of the mixtures and to their partial or complete hydrogenation.

Tough, transparent materials based on anionic polymerized styrene-butadiene block copolymers are known and are established in the market for extrusion applications and injection molding applications. The block copolymers may have a linear or star-shaped structure. The star-shaped block copolymers, generally prepared via coupling, are achieved an asymmetrical structure via double or multiple initiation.

Linear styrene-butadiene block copolymers are generally initiated only once. An asymmetrical structure can be achieved via an appropriate monomer sequence. A long, external styrene block brings about a degree of compatibility of the block copolymer with standard polystyrene. These block copolymers can therefore be blended, in order to increase stiffness, with less expensive standard polystyrene in amounts of from 10 to 70% by weight, based on the blend. Depending on the amount of polystyrene, transparency decreases and at the same time haze arises. Optical properties are generally disadvantageous in particular in the economically attractive mixtures using about 60% by weight of standard polystyrene.

A wide variety of structures is known for styrene-butadiene block copolymers and mixtures with polystyrene. The block copolymers may be linear or have star-shaped branching, and may have blocks of identical or different molar masses, the result being symmetrical and asymmetrical structures. The butadiene-containing blocks may also comprise styrene. Between the individual blocks, sharp or tapered transitions can occur. An example of an overview of styrene-butadiene block copolymers is found in Kunststoff Handbuch [Plastics Handbook], vol. 4, Polystyrol [Polystyrene], Carl Hanser-Verlag Munich, Vienna 1996, chapter 3.3.4, pages 161-164.

DE-A 29 40 861 discloses mixture of linear three-block copolymers S-B-S with different constitution and molar masses. The mixture is obtained via sequential anionic polymerization using double, joint feed of initiator and styrene. The ratio of the amount of the initiator in the first stage to that in the second stage is in the range from 1:2 to 1:7, and this means that the block copolymer having the relatively short styrene block is markedly predominant. While the transition between the first styrene block and the butadiene-containing block is sharp, the butadiene-containing block has a gradual transition into the second styrene block.

U.S. Pat. No. 5,227,419 describes mixtures of block copolymers whose butadiene-containing blocks have a styrene gradient. The amount of block copolymer having the relatively high styrene block content is likewise subordinate in the mixture.

However, in mixtures with polystyrene, for comparable toughness, the block copolymers described lead to a drastic reduction in stiffness compared with that of polystyrene. Heat resistance is also lowered markedly.

WO 03/046075 describes transparent mixtures composed of linear three-block copolymers having terminal styrene blocks and polystyrene. The mixtures can be obtained via double initiation.

WO 00/58380 describes, inter alia, linear block copolymers with improved toughness efficiency, having a copolymer block composed of styrene and butadiene with random distribution. However, the mixtures mentioned can, under certain processing conditions, e.g. with excessive residence times at 200° C. without shear, separate and thus cause haze.

It was an object of the invention to eliminate the disadvantages described and to provide transparent mixtures of styrene-butadiene block copolymers which, in blends with polystyrene, have high toughness and good transparency, even for relatively high polystyrene contents.

Accordingly, the abovementioned mixtures have been found.

The (I)/(II) ratio of the block copolymers is in the range from 0.5 to 10, preferably in the range from 1 to 5, particularly preferably in the range from 2 to 3.

Examples of vinylaromatic monomers which may be used are styrene, alpha-methylstyrene, ring-alkylated styrenes, such as p-methylstyrene or tert-butylstyrene, or 1,1-diphenylethylene, or a mixture thereof.

Preferred dienes are butadiene, isoprene, 2,3-dimethylbutadiene, 1,3-pentadiene, 1,3-hexadiene or piperylene, or a mixture of these; butadiene and isoprene are particularly preferred.

Particularly preferred block copolymers are formed from the monomers styrene and butadiene.

The blocks $B_1$ and $B_2$ may be composed exclusively of dienes or may be composed of dienes and of vinylaromatic monomers. The vinylaromatic monomer/diene ratio for the blocks $B_1$ and $B_2$ is generally in the range from 0 to 2, and the vinylaromatic monomer/diene ratios in the blocks $B_1$ and $B_2$ here can be identical or different. The blocks $B_1$ and $B_2$ are preferably homopolydiene blocks, in particular homopolybutadiene blocks, or copolymer blocks whose vinylaromatic monomer/diene ratio is in the range from 0.3 to 1.5. The copolymer blocks particularly preferably have random distribution of the diene monomers and vinylaromatic monomers.

The transitions between the individual blocks are sharp, and this means that the constitution changes abruptly.

The number-average molar masses $M_n$ of $S_1$ are in the range from 40 000 to 100 000 g/mol, preferably in the range from 60 000 to 85 000 g/mol, particularly preferably in the range from 70 000 to 80 000 g/mol. The number-average molar masses $M_n$ of each of $S_2$ and $S_3$, each independently of the other, are in the range from 5000 to 20 000 g/mol, preferably in the range from 8000 to 17 000 g/mol, particularly preferably in the range from 11 000 to 14 000 g/mol. The number-average molar mass Mn of each of the blocks $B_1$ and $B_2$ composed of dienes, or copolymer blocks composed of dienes and of vinylaromatic monomers, each independently of the other, are in the range from 15 000 to 100 000 g/mol, preferably in the range from 50 000 to 75 000 g/mol, particularly preferably in the range from 60 000 to 70 000 g/mol.

The block copolymers (I) preferably have an asymmetrical structure, and this means that the blocks $S_1$ and $S_2$ have different number-average molar masses $M_n$, the $S_1$:$S_2$ number-average molar masses ratio preferably being at least 2, preferably in the range from 5 to 8.

A method of preparing the inventive mixtures comprises preparing each of the block copolymers (I) and (II) via sequential anionic polymerization of vinylaromatic monomers and of dienes using organic compounds of alkali metals as initiators, in succession or in different reactors, and then blending them in a (I)/(II) ratio in the range from 0.5 to 10.

By way of example, preferred inventive block copolymers may be formed via sequential anionic polymerization, and at least the polymerization of the soft blocks (B/S) here takes place in the presence of a randomizer. The presence of randomizers brings about random distribution of the dienes and of the vinylaromatic units in the soft block (B/S). Suitable randomizers are donor solvents, such as ethers, for example tetrahydrofuran, or tertiary amines, or soluble potassium salts. In the case of tetrahydrofuran, ideal random distribution requires amounts which are generally above 0.25 percent by volume, based on the solvent. At low concentrations, the result is what are known as tapered blocks having a gradient in the constitution of the comonomers.

The stated relatively high amounts of tetrahydrofuran simultaneously increase the relative proportion of 1,2-linkages of the diene units to from about 30 to 35%.

In contrast, use of potassium salts increases the 1,2-vinyl content in the soft blocks only insubstantially. The resultant block copolymers are therefore less susceptible to crosslinking and have a lower glass transition temperature at the same butadiene content.

The amount of the potassium salt used, based on the anionic polymerization initiator, is generally substoichiometric. The molar ratio selected of anionic polymerization initiator to potassium salt is preferably in the range from 10:1 to 100:1, particularly preferably in the range from 30:1 to 70:1. The potassium salt used should generally be soluble in the reaction medium. Examples of suitable potassium salts are potassium alcoholates, in particular a potassium alcoholate of a tertiary alcohol having at least 5 carbon atoms. It is particularly preferable to use potassium 2,2-dimethyl-1-propanolate, potassium 2-methylbutanolate (potassium tert-amyl alcoholate), potassium 2,3-dimethyl-3-pentanolate, potassium 2-methylhexanolate, potassium 3,7-dimethyl-3-octanolate (potassium tetrahydrolinaloolate) or potassium 3-ethyl-3-pentanolate. By way of example, the potassium alcoholates are obtainable via reaction of elemental potassium, potassium/sodium alloy, or potassium alkoxides with the corresponding alcohols in an inert solvent.

It is advantageous to delay addition of the potassium salt until the anionic polymerization initiator has been added to the reaction mixture. This method can avoid hydrolysis of the potassium salt via traces of protic contaminants. It is particularly preferable to add the potassium salt shortly prior to the polymerization of the random soft block B/S.

The anionic polymerization initiator used may be the conventional monofunctional alkyl, aryl, or aralkyl compounds of alkali metals. It is advantageous to use organolithium compounds, such as ethyl-, propyl-, isopropyl-, n-butyl-, sec-butyl-, tert-butyl-, phenyl-, diphenylhexyl-, butadienyl-, isoprenyl-, polystyryllithium. The amount needed of polymerization initiator depends on the desired molecular weight. It is generally in the range from 0.001 to 5 mol %, based on the total amount of monomer.

The polymerization may be undertaken in the presence of a solvent. Solvents suitable for the anionic polymerization process are the conventional aliphatic, cycloaliphatic, or aromatic hydrocarbons having from 4 to 12 carbon atoms, e.g. pentane, hexane, heptane, cyclohexane, methylcyclohexane, isooctane, benzene, alkylbenzenes, such as toluene, xylene, ethylbenzene, or decalin, or suitable mixtures. It is preferable to use cyclohexane and methylcyclohexane.

The polymerization process may also be carried out without solvent in the presence of metal organyl compounds which reduce polymerization rate, e.g. alkyl compounds of magnesium, of aluminum, or of zinc.

Once the polymerization process has ended, the living polymer chains can be capped by a chain terminator. Suitable chain terminators are protic substances or Lewis acids, e.g. water, alcohols, aliphatic or aromatic carboxylic acids, or else inorganic acids, such as carbonic acid or boric acid.

The blending of the block copolymers can take place at any desired time after the polymerization process has ended, e.g. prior to or after termination, devolatilization, or other treatment steps. The chronologically or spatially separate preparation of the block copolymers (I) and (II) has the advantage that the number-average molar masses $M_n$ of the individual blocks S and B can be freely selected.

In an alternate process, the block copolymers (I) and (II) can be prepared via sequentional anionic polymerization of vinylaromatic monomers and of dienes using organic compounds of alkali metals as initiators simultaneously in one reactor via double initiation. In a first stage, joint feed of initiator $I_1$ and of vinylaromatic monomers takes place, and in a second stage, after complete conversion of the vinylaromatic monomers of the first stage, joint feed of initiator $I_2$ and of dienes or of dienes and of vinylaromatic monomers takes place. The ratio of the amount of initiator $I_1$ of the first feed to the amount of initiator $I_2$ of the second feed is selected in the range from 0.5 to 10. After each feed, polymerization is continued until conversion of the monomers is complete. The mixtures obtained by this process have, respectively, identical number-average molar masses $M_n$ for the blocks $S_2$ and $S_3$, and identical number-average molar masses $M_n$ for the blocks $B_1$ and $B_2$. Table 1 gives the successive feeds and the polymer species formed:

TABLE 1

| Feed sequence for double initiator feed | | |
|---|---|---|
| Stage | Monomers, initiator | Species formed |
| 1 | Initiator ($I_1$) and vinylaromatic monomer | $S_1$—$I_1$ |
| 2 | Initiator ($I_2$) and diene or diene and vinylaromatic monomer | $S_1$—$B_1$—$I_1$ $B_2$—$I_2$ |
| 3 | Vinylaromatic monomer | $S_1$—$B_1$—$S_2$—$I_1$ $B_2$—$S_3$—$I_2$ |
| 4 | Terminator reagent, e.g. isopropanol | $S_1$—$B_1$—$S_2$ $B_2$—$S_3$ |

If a mixture composed of diene/vinylaromatic monomer is used in stage 2, random distribution of the vinylaromatic monomers and dienes in blocks $B_1$ and $B_2$ can be achieved via addition of Lewis bases, such as tetrahydrofuran, or of potassium salts, such as potassium tetrahydrolinaloolate.

Repeated feed of dienes or of dienes and of vinylaromatic monomers between stage 2 and 3 without fresh feed of initiator can form blocks $B_1$ and $B_2$ which are composed of two or more sub blocks. A particularly preferred method is to use in stage 2 a mixture of dienes and of vinylaromatic monomers and, after complete conversion, again to feed a mixture of dienes and vinylaromatic monomers with different vinylaromatic monomer/diene ratio, and polymerize the mixture. This method gives blocks $B_1$ and $B_2$ each of which is composed of two copolymer blocks $(B/S)_a$ and $(B/S)_b$, where the vinylaromatic monomer/diene ratio in the block $(B/S)_a$ is in the range from 1 to 1.5 and in the block $(B/S)_b$ is in the range from 0.3 to 1. After stages 3 and 4, the product is therefore the structures (I) $S_1$-$(B/S)_a$-$(B/S)_b$-$S_2$ and (II) $(B/S)_a$-$(B/S)_b$-$S_3$.

The inventive mixture comprises block copolymers having one and two terminal blocks S composed of vinylaromatic polymers. In order to inhibit separation of the block copolymers and impairment of the transparency of the mixture, the amount of the second initiator feed $I_2$ should be smaller than that of the first initiator feed $I_1$. The division of the initiator brings about better compatibility of the inventive mixture with standard polystyrene using an average $M_w$ in the range from 180 000 to 350 00 g/mol. The initiator ratio $I_1/I_2$ is preferably in the range from 0.5/1 to 10/1, particularly preferably in the range from 2/1 to 3/1.

The inventive mixtures composed of the linear block copolymers (I) and (II) can be blended widely with thermoplastic polymers. Preferred mixtures comprise from 5 to 95 percent by weight of the linear block copolymers (I) and (II), and from 95 to 5 percent by weight of standard polystyrene (GPPS) or impact-resistant polystyrene (HIPS). Mixtures of this type can be prepared via compounding during the devolatilization of the block copolymers, for example via addition of polystyrene in the form of "cold feed" in a vented extruder. The joint treatment process gives homogeneous ternary mixtures which can easily be used by the processor directly in non-mixing injection-molding machines. As an alternative, however, mixtures of pellets can be processed directly in kneaders, extruders, or mixing injection-molding machines, directly to give ternary mixtures. In film production, the blending process generally takes place directly in the compounding extruder.

The mixtures feature high toughness together with high stiffness. By way of example, this is seen in relatively high tensile strain at break at the same modulus of elasticity, when comparison is made with conventional styrene/butadiene block copolymer mixtures with polystyrenes. They are therefore suitable especially for injection molding and permit material-saving design because their toughness/stiffness ratio is good. The mixtures can be processed to give tough moldings, such as transparent clothes hangers, which have very good dimensional stability even at relatively high temperatures.

Preference is likewise given to applications in extrusion, for example for production of thermoforming films, which can then be thermoformed to give cups, lids, lunch boxes, and other containers. The high toughness/stiffness ratio makes it possible to use relatively thin films here while retaining strength, the result being a significant saving in material.

The inventive block copolymer mixtures can be modified via partial or complete hydrogenation. The degree of hydrogenation of the olefinic double bonds is generally 97% and higher, and the degree of hydrogenation of the vinylaromatic monomers is preferably at least 90%, particularly preferably at least 95%, in particular 98%.

The proportion of the copolymerized diene units present in the 1,2-vinyl form can be regulated via addition of substances with donor properties, e.g. ethers or amines.

For this purpose preference is given to tetrahydrofuran, dimethoxyethane, or 2-alkyl furfuryl ethers in amounts of from 0.1 to 1% by volume, in particular from 0.25 to 0.5% by volume, based on the hydrocarbon used as solvent, e.g. cyclohexane.

Subsequent to the preparation of the block copolymer, the unsaturated bonds of the diene units, and also of the vinylaromatic units of the block copolymer, are hydrogenated using a hydrogenation catalyst. It is preferable to use supported hydrogenation catalysts. Examples of suitable support materials are inorganic substrates, such as barium sulfate, silicates, carbon, or aluminum oxides. Examples of suitable hydrogenation metals are nickel, cobalt, rhodium, ruthenium, palladium, platinum, or other metals of group 8.

The hydrogenation process preferably takes place in a saturated hydrocarbon as solvent, in which the block copolymer is soluble. Cycloaliphatic hydrocarbons are preferred, in particular cyclohexane. The solvent used is usefully the same as that used during the polymerization process, so that the hydrogenation can take place in a single process step subsequent to the polymerization process. The hydrogenation process can take place batchwise or continuously, and preference is given to continuous hydrogenation on a fixed-bed catalyst.

The hydrogenation process generally takes place at temperatures in the range from 40° C. to 250° C., particularly preferably in the range from 120° C. to 180° C. The hydrogenation process can be carried out at from atmospheric pressure to 350 bar, preferably in the range from 100 to 250 bar.

INVENTIVE EXAMPLES

Modulus of elasticity, tensile strength, and tensile strain at break were determined to ISO 527 on stamped-out standard tensile specimens from pressed 1 mm sheets. (Press conditions: 200° C., 5 min).

The transmittance measurements took place in the range from 400 to 700 nm on pressed disks of thickness 4 mm. (Press conditions: 200° C., 5 min).

Inventive Examples 1-3

The block copolymer mixtures were prepared as stated in table 2 via sequential anionic polymerization using double initiator feed (sec-butyllithium BuLi) in stage 1 or 2 at solids contents of about 30% by weight in cyclohexane at temperatures in the range from 50 to 80° C. Once the polymerization process had ended, isopropanol was used for termination and the mixture was acidified with $CO_2$/water. The polymerizatiom process was carried out in the presence of potassium tert-amyl alcoholate (PTA) at a molar lithium/potassium ratio of 38/1, in order to obtain a random S/B copolymer block. The block copolymers were freed from solvent in a 16 mm vented extruder.

The resultant block copolymer mixtures comprise block copolymer having random copolymer blocks of the structure (I) $S_1$-$(B/S)_a$-$(B/S)_b$-$S_2$ whose number-average molar mass is about 150 000 g/mol, and of the structure (II) $(B/S)_a$-$(B/S)_b$-$S_3$ whose number-average molar mass is about 75 000 g/mol, in a (I)/(II) molar ratio corresponding to the initiator ratio $I_1/I_2$.

TABLE 2

| Stage | Feed | Inventive example 1 | Inventive example 2 | Inventive example 3 |
| --- | --- | --- | --- | --- |
| 1 | sec-BuLi [mol] | 27.812 | 25.65 | 27.81 |
|   | Styrene [kg] | 2050 | 1950 | 2170.4 |
|   | PTA [mol] | 1.012 | 1.012 | 1.012 |
| 2a | sec-BuLi [mol] | 10.656 | 12.82 | 10.66 |
|   | Butadiene/styrene [kg] | 565/785 | 565/785 | 519.8/752.3 |
| 2b | Butadiene/styrene [kg] | 685/415 | 685/415 | 630.2/397.7 |
| 3 | Styrene | 500 | 600 | 529.6 |
|   | $I_1/I_2$ | 2.6/1 | 2/1 | 2.6/1 |

Inventive Examples 1A to 3C

Each of the block copolymer mixtures of inventive examples 1 to 3 was mixed with 60% by weight (A), 50% by weight (B), and 40% by weight (C) of polystyrene whose average molecular weight $M_n$ is about 270 000 (PS 158 K from BASF Aktiengesellschaft), at 200° C. in a 19 mm twin-screw extruder. The mechanical and optical properties of the blends are given in table 3.

Comparative Experiments Ac, Bc and Cc

By analogy with inventive examples 1A to 3C, a linear styrene-butadiene block copolymer of the structure $S_1$-$(B/S)_1$-$(B/S)_2$-$S_2$ having random (B/S) blocks was prepared in accordance with example 3 of WO 00/58380, and mixed with 60% by weight (A), 50% by weight (B) and 40% (C) of PS 158 polystyrene at 200° C. in a 19 mm twin-screw extruder.

TABLE 3

Properties of blends of inventive examples 1-3 using PS 158 K polystyrene

| Example | Modulus of elasticity [N/mm²] | Stress | | | Strain | | | Transparency [%] | Haze [%] | YI |
| --- | --- | --- | --- | --- | --- | --- | --- | --- | --- | --- |
| | | FS [N/mm²] | Fmax. [N/mm²] | FR [N/mm²] | FS [%] | Fmax. [%] | FR [%] | | | |
| 1A | 595 | — | 24.9 | 24.8 | — | 252.3 | 253 | 70.7 | 8.7 | 29.8 |
| 1B | 927 | 22.8 | 23.1 | 22.2 | 13.9 | 78.3 | 129.2 | 65.7 | 13 | 36 |
| 1C | 913 | 23 | 24.7 | 23.9 | 6.1 | 64.8 | 93.2 | 65 | 12.7 | 37.4 |
| 2A | 715 | — | 25 | 24.9 | — | 259.9 | 260.2 | 68.1 | 16.9 | 31 |
| 2B | 717 | 18.3 | 23.6 | 23.5 | 11 | 190.2 | 200.9 | 62.1 | 20.7 | 37.1 |
| 2C | 858 | 20.7 | 24.7 | 23.5 | 5.8 | 94.7 | 137.1 | 63.3 | 19 | 36.2 |
| 3A | 745 | — | 23.7 | 23.6 | — | 230.3 | 231.7 | 69.2 | 11.3 | 29.8 |
| 3B | 866 | 20 | 22.7 | 22.3 | 10.6 | 114.7 | 145 | 66.9 | 13.2 | 32.7 |
| 3C | 1242 | 25.1 | 25.1 | 23.4 | 4.7 | 4.8 | 71.4 | 65.3 | 13.4 | 33.9 |
| Ac | 1092 | — | 27.5 | 26.9 | — | 239.6 | 242.5 | 45.0 | 75.7 | 17.7 |
| Bc | 1192 | 21.4 | 28.5 | 28.1 | 6.8 | 171 | 187.8 | 44.6 | 86.2 | 15.2 |
| Cc | 1368 | 26.5 | 29.9 | 28.4 | 3.0 | 76.6 | 101.7 | 45.3 | 76.2 | 16.1 |

FS = yield stress
Fmax = maximum stress
FR = stress for tensile strain at break
YI = yellowness index

We claim:

1. A mixture comprising linear block copolymers composed of vinylaromatic monomers and dienes of the structure (I) $S_1$-$B_1$-$S_2$ and (II) $B_2$-$S_3$, where $S_1$ is a block composed of vinylaromatic monomers whose number-average molar mass $M_n$ is in the range from 40 000 to 100 000 g/mol, each of $S_2$ and $S_3$ is a block composed of vinylaromatic monomers whose number-average molar mass Mn is in the range from 5000 to 20 000 g/mol, each of $B_1$ and $B_2$ is one or more blocks composed of dienes or is copolymer blocks composed of dienes and of vinylaromatic monomers whose number-average molar mass $M_n$ is in the range from 15 000 to 100 000 g/mol, and the molar ratio of the block copolymers (I)/(II) is in the range from 0.5 to 10.

2. The mixture according to claim 1, wherein the (I)/(II) ratio of the block copolymers is in the range from 2 to 3.

3. The mixture as claimed in claim 1, wherein the vinylaromatic monomer/diene ratio in the blocks $B_1$ and $B_2$ is in the range from 0.3 to 1.5.

4. The mixture according to claim 1, wherein each of the blocks $B_1$ and $B_2$ is one or more copolymer blocks composed of dienes and of vinylaromatic monomers with random distribution.

5. The mixture according to claim 1, wherein the number-average molar masses $M_n$ of $S_1$ are in the range from 60 000 to 85 000 g/mol, of each of $S_2$ and $S_3$ are in the range from 8000 to 17 000 g/mol, and of each of $B_1$ and $B_2$ are in the range from 50 000 to 75 000 g/mol.

6. The mixture according to claim 1, wherein each of the blocks $B_1$ and $B_2$ is composed of two copolymer blocks composed of dienes and of vinylaromatic monomers, where the vinylaromatic monomer/diene ratio in the first block is in the range from 1 to 1.5 and in the second block is in the range from 0.3 to 1.

7. The mixture according to claim 1, wherein, respectively, the number-average molar masses $M_n$ of $S_2$ and $S_3$ and the number-average molar masses of $B_1$ and $B_2$ have the same value.

8. The mixture according to claim 1, which comprises from 5 to 95 percent by weight of the linear block copolymers (I) and (II), and from 95 to 5 percent by weight of standard polystyrene or impact-resistant polystyrene.

9. A modified mixture obtainable via partial or complete hydrogenation of the mixtures according to claim 1.

10. The mixture according to claim 9, wherein the degree of hydrogenation of olefinic double bonds is at least 97% and the degree of hydrogenation of the vinylaromatic monomer units is at least 90%.

11. The mixture according to claim 8, wherein more than 30%, based on the entirety of the diene units, of the copolymerized diene units are present in the 1,2-vinyl form.

12. A process for preparation of a mixture according to claim 1, which comprises preparing each of the block copolymers (I) and (II) chronologically and/or spatially separate via sequential anionic polymerization of vinylaromatic monomers and of dienes using organic compounds of alkali metals as initiators, and then blending them in a (I)/(II) molar ratio in the range from 0.5 to 10.

13. A process for preparation of a mixture according to claim 7, which comprises preparing the block copolymers (I) and (II) via sequential anionic polymerization of vinylaromatic monomers and of dienes using organic compounds of alkali metals as initiators simultaneously in a reactor via double initiation, comprising the joint feed of initiator $I_1$ and of vinylaromatic monomers in a first stage, and joint feed of initiator $I_2$ and of dienes or of dienes and of vinylaromatic monomers in a second stage, where the molar ratio of the amount of initiator $I_1$ of the first feed to the amount of initiator $I_2$ of the second feed is in the range from 0.5 to 10.

14. The mixture as claimed in claim 2, wherein the vinylaromatic monomer/diene weight ratio in the blocks $B_1$ and $B_2$ is in the range from 0.3 to 1.5.

15. The mixture according to claim 2, wherein each of the blocks $B_1$ and $B_2$ is one or more copolymer blocks composed of dienes and of vinylaromatic monomers with random distribution.

16. The mixture according to claim 3, wherein each of the blocks $B_1$ and $B_2$ is one or more copolymer blocks composed of dienes and of vinylaromatic monomers with random distribution.

17. The mixture according to claim 2, wherein the number-average molar masses $M_n$ of
$S_1$ are in the range from 60 000 to 85 000 g/mol,
of each of $S_2$ and $S_3$ are in the range from 8000 to 17 000 g/mol,
and of each of $B_1$ and $B_2$ are in the range from 50 000 to 75 000 g/mol.

18. The mixture according to claim 3, wherein the number-average molar masses $M_n$ of
$S_1$ are in the range from 60 000 to 85 000 g/mol,
of each of $S_2$ and $S_3$ are in the range from 8000 to 17 000 g/mol,
and of each of $B_1$ and $B_2$ are in the range from 50 000 to 75 000 g/mol.

19. The mixture according to claim 4, wherein the number-average molar masses $M_n$ of
$S_1$ are in the range from 60 000 to 85 000 g/mol,
of each of $S_2$ and $S_3$ are in the range from 8000 to 17 000 g/mol,
and of each of $B_1$ and $B_2$ are in the range from 50 000 to 75 000 g/mol.

20. The mixture according to claim 2, wherein each of the blocks $B_1$ and $B_2$ is composed of two copolymer blocks composed of dienes and of vinylaromatic monomers, where the vinylaromatic monomer/diene ratio in the first block is in the range from 1 to 1.5 and in the second block is in the range from 0.3 to 1.

* * * * *